(12) United States Patent
Taurand

(10) Patent No.: US 6,473,323 B1
(45) Date of Patent: Oct. 29, 2002

(54) DEVICE FOR TRANSFERRING ENERGY TO A TRANSFORMER SECONDARY DURING A PREDETERMINED TIME PERIOD

(75) Inventor: Christophe Taurand, Valence (FR)

(73) Assignee: Thomson-CSF Sexant, Velizy Villacoublay (FR)

( * ) Notice: Subject to any disclaimer, the term of this patent is extended or adjusted under 35 U.S.C. 154(b) by 0 days.

(21) Appl. No.: 09/850,746
(22) PCT Filed: Nov. 19, 1999
(86) PCT No.: PCT/FR99/02851
§ 371 (c)(1),
(2), (4) Date: May 21, 2001
(87) PCT Pub. No.: WO00/31865
PCT Pub. Date: Jun. 2, 2000

(30) Foreign Application Priority Data

Nov. 20, 1998 (FR) ............................................. 98 14640

(51) Int. Cl.$^7$ ................................................ H02M 5/42
(52) U.S. Cl. ........................................................ 363/89
(58) Field of Search ........................... 363/53, 890, 127, 363/84

(56) References Cited

U.S. PATENT DOCUMENTS

| | | | | |
|---|---|---|---|---|
| 4,748,342 A | * | 5/1988 | Dijkmans | ..................... 307/66 |
| 5,488,554 A | * | 1/1996 | Green | ........................ 363/25 |
| 5,636,108 A | | 6/1997 | Taurand | |
| 5,793,625 A | | 8/1998 | Balogh | |
| 5,946,202 A | * | 8/1999 | Balogh | ........................ 363/26 |
| 6,128,206 A | * | 10/2000 | Sun et al. | ................... 363/127 |
| 6,285,568 B1 | | 9/2001 | Taurand | |

FOREIGN PATENT DOCUMENTS

| | | |
|---|---|---|
| DE | 295 04 861 | 8/1995 |
| DE | 196 07 243 | 8/1997 |

OTHER PUBLICATIONS

Patent Abstracts of Japan, JP 08–237998, Sep. 13, 1996, Sato, Yoshio.
Patent Abstracts of Japan, JP 57–208864, Dec. 22, 1982, Saito, Ryoji.
Patent Abstracts of Japan, JP 10–155273, Jun. 9, 1998, Tanaka Ryozo.

* cited by examiner

*Primary Examiner*—Shawn Riley
(74) *Attorney, Agent, or Firm*—Oblon, Spivak, McClelland, Maier & Neustadt, P.C.

(57) ABSTRACT

A device for transferring power by an electrical energy transformer, and in particular by a magnetic coupler, including on a primary side a primary winding in series with an alternating source and on a secondary side a secondary winding, a rectifier bridge, and a load. The rectifier bridge includes two diodes arranged in series with the secondary winding and two MOS transistors also in series with the secondary winding. The load is connected on the one hand to a point common to the two diodes and on the other hand to a point common to the two MOS transistors. A mechanism is provided for switching the MOS transistors in such a way that they are simultaneously in the ON state for a predetermined duration. Such a device may find application to cases of weak coupling between a primary side and a secondary side.

4 Claims, 4 Drawing Sheets

DEVICE FOR TRANSFERRING ENERGY TO A TRANSFORMER SECONDARY DURING A PREDETERMINED TIME PERIOD

BACKGROUND OF THE INVENTION

1. Field of the Invention

The present invention relates to a device for transferring power by electrical energy transformer, and in particular by magnetic coupler, and more particularly such a device comprising on a primary side a primary winding in series with an alternating source and on a secondary side a secondary winding, a rectifier bridge and a load.

2. Description of the Related Art

These devices exhibit, in general, two major drawbacks.

Firstly, magnetic couplers have poor efficiencies owing to the physical separation of their primary and secondary windings. This poor efficiency is due more particularly to a considerable leakage inductance which makes the known structures, for example of the flyback or forward type, unusable.

Moreover, the devices of the known type also exhibit the drawback that regulation thereof does not generally enable them to be implemented simply by bringing the primary and secondary windings closer together.

SUMMARY OF THE INVENTION

The present invention aims to alleviate these drawbacks.

Accordingly, the subject of the invention is a device for transferring power by electrical energy transformer, and in particular by magnetic coupler, comprising on a primary side a primary winding in series with an alternating source and on a secondary side a secondary winding, a rectifier bridge and a load, characterized in that the rectifier bridge comprises two diodes arranged in a known manner in series with the secondary winding and two MOS transistors also in series with the secondary winding, the load being connected on the one hand to the point common to the two diodes and on the other hand to the point common to the two MOS transistors, means being provided for switching the said transistors in such a way that they are simultaneously in the on state for a predetermined duration.

It will be seen that such a layout amounts to short-circuiting the supply to the primary onto the leakage inductance. The high value of this inductance is thus harnessed for use as storage inductance. In the invention, this high value of the leakage inductance therefore no longer constitutes a drawback.

Advantageously, the said means are provided for switching the said MOS transistors in such a way that the said duration occurs while the two diodes are off.

There is therefore no transfer of energy to the load during the storage phase in the leakage inductance.

Furthermore, the device can then be regulated by determining the duration of the storage phase as a function of the desired output current.

Regulation is thus performed solely at the secondary. The device can thus be put into service simply by bringing the primary and secondary windings physically closer together.

A particular embodiment of the invention will now be described by way of non-limiting example with reference to the appended drawings in which:

BRIEF DESCRIPTION OF THE INVENTION

DETAILED DESCRIPTION OF THE INVENTION

Figure 1:
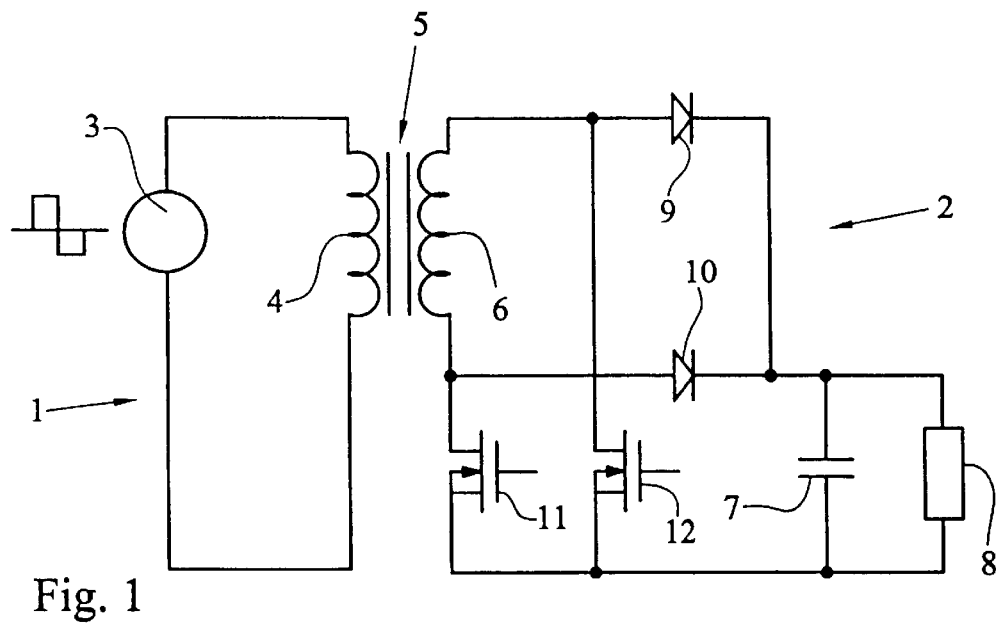
FIG. 1 is an electrical diagram of an energy transfer device according to the invention.

FIG. 1 depicts an electrical circuit composed of a primary circuit 1 and of a secondary circuit 2.

The primary circuit 1 consists simply of a voltage source 3 in series with the primary winding 4 of a magnetic coupler 5. The source 3 is an alternating source, here a source of rectangular signals with duty ratio equal to 50%.

The secondary winding 6 of the magnetic coupler 5 is connected to the input of a rectifier bridge whose output is applied to a capacitor 7 and to a load 8.

Two of the branches of the rectifier bridge are occupied in a known manner each by a diode 9 and 10 respectively. The diodes 9 and 10 are arranged in series with the winding 6, head-to-tail, each conducting in the direction going from its point of connection to the winding 6 to their common point.

The other two branches of the rectifier bridge are occupied by two MOS transistors 11 and 12 respectively. The MOS transistors are controlled in any appropriate manner, in such a way as to obtain the sequence of phases which will be described hereinbelow.

The output from the rectifier bridge is tapped off between the point common to the two diodes and the point common to the two MOS transistors.

Figure 2:
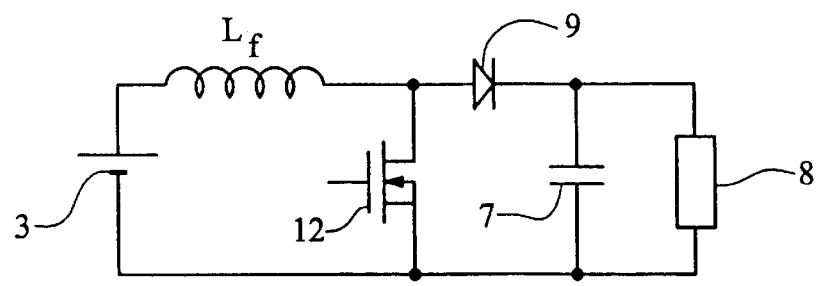
FIG. 2 is an equivalent diagram valid during one alternation of the cycle.

FIG. 2 is an equivalent diagram, seen from the secondary, of the circuit of FIG. 1 for the first alternation (positive) of the source 3.

This figure depicts the source 3, the leakage inductance $L_p$, the MOS transistor 12 capable of short-circuiting this leakage resistance onto the source, the diode 9, the capacitor 7 and the load 8.

The manner of operation of this circuit will now be described with reference to FIGS. 3 and 4.

Figure 3A:
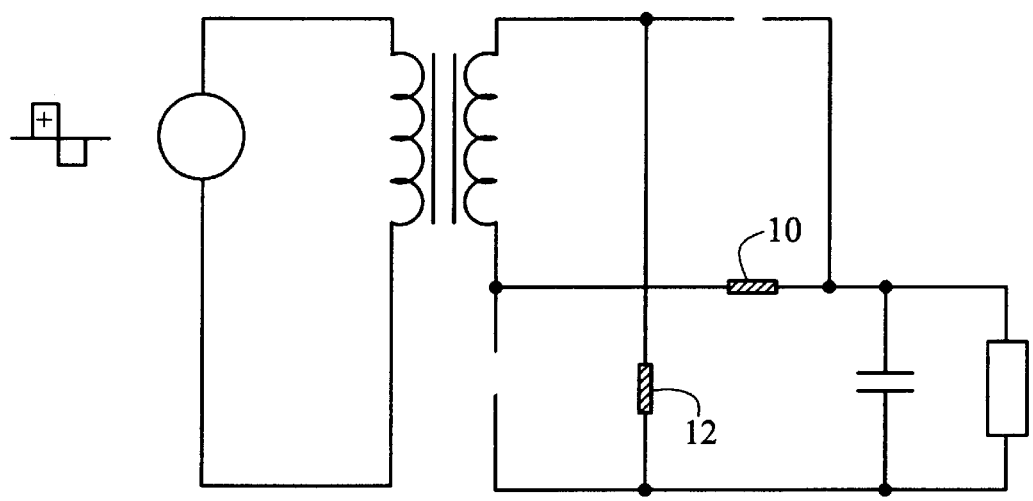
FIGS. 3a to 3f are also equivalent diagrams of the device during the six successive phases of a cycle.
Figure 3B:
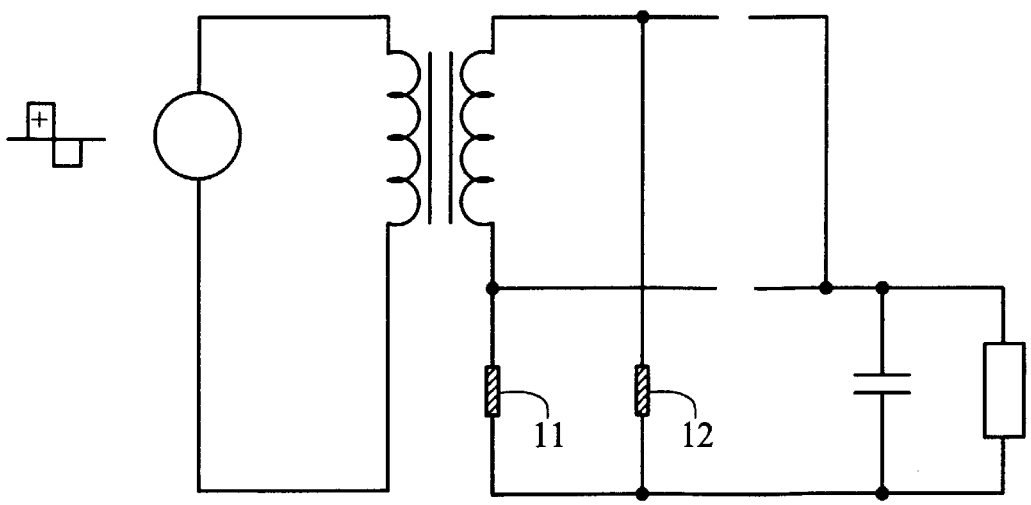
Figure 3C:
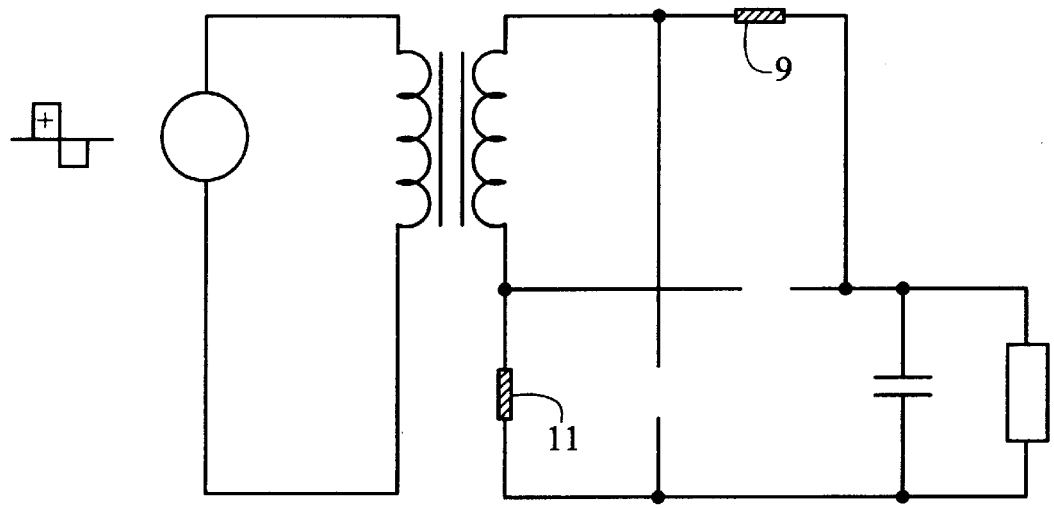

In the course of phase 1 represented in FIG. 3a, the transistor 12 and the diode 10 are conducting. The transistor 11 and the diode 9 are in the off state. This phase sees a rapid growth in the primary and secondary currents.

Figure 4:
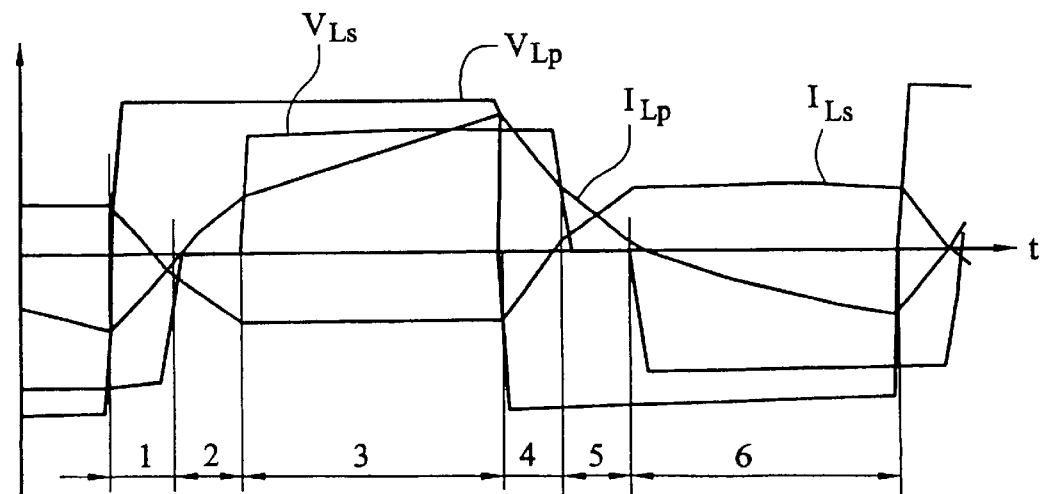
FIG. 4 is a chart of the variations in the course of a cycle of certain electrical quantities.

FIG. 4 illustrates the variations in the voltage $V_{Ls}$ across the terminals of the secondary winding, of the voltage $V_{Lp}$ across the terminals of the primary winding of the intensity $I_{Ls}$ in the secondary winding and of the intensity $I_{Lp}$ in the primary winding (equal to $I_{Ls}$ plus the current in the magnetizing inductance).

The switch to phase 2 occurs upon the vanishing of the secondary current $V_{Ls}$ and hence the turning off of the diode 10. The drain/source voltage is detected at zero and the MOS transistor 11 trips.

Phase 2 is that of the storage of energy in the leakage inductance. No transfer of energy occurs to the output.

The two diodes are off while the MOS transistors 11 and 12 are both on.

In FIG. 4 it may be seen that the voltage $V_{Ls}$ across the terminals of the secondary winding is obviously zero.

The duration of this phase is slaved to the desired output current. The switch to the next phase 3 occurs at the end of this duration of slaving.

The MOS transistor 12 is then off and the diode 9 switches on.

This phase 3 (FIG. 3c) is that of the direct transfer of energy from the primary to the secondary. The secondary voltage $V_{Ls}$ is practically stable.

In this phase 3, the diode 9 and the MOS transistor 11 are on.

The switch to the next phase occurs at the end of the first alternation of the primary voltage.

The MOS transistors 11 and 12 are controlled by a controller circuit with a view to obtaining the manner of operation described earlier. This controller circuit receives on the one hand the information regarding the voltages between the drain and the source of the MOS transistors 11 and 12, and on the other hand an error information item resulting from the difference in voltage between a voltage across the terminals of the load and a reference voltage.

When the current in a diode vanishes, following the changing of polarity of the primary source, an inverse voltage appears on this diode. This voltage increases up to the moment at which the drain/source voltage of the MOS connected to this diode vanishes. The controller circuit then decides to close this MOS by detecting the voltage zero on the drain. The other MOS is turned off (opened) only after a time T. This time T is given by the error amplifier in a traditional manner.

Figure 3D:
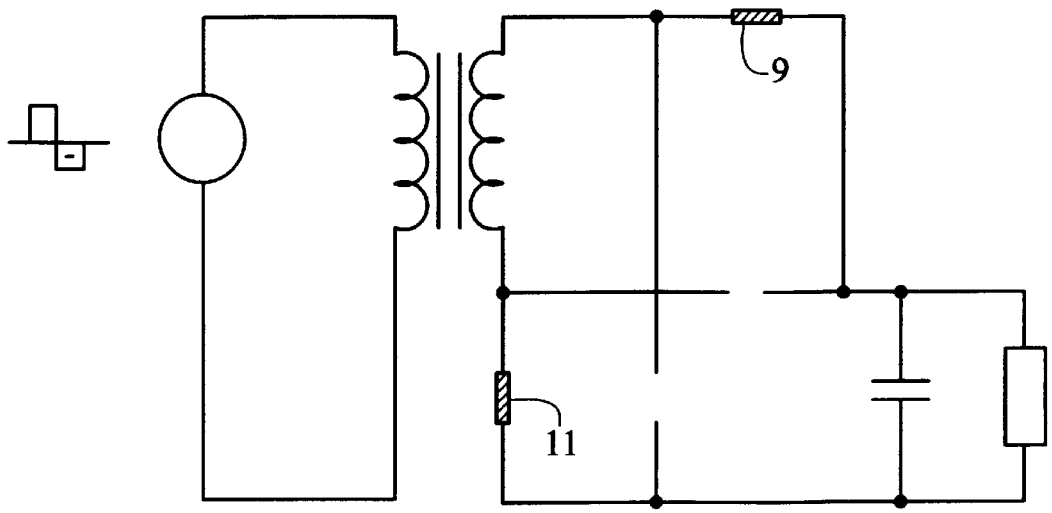
Figure 3E:
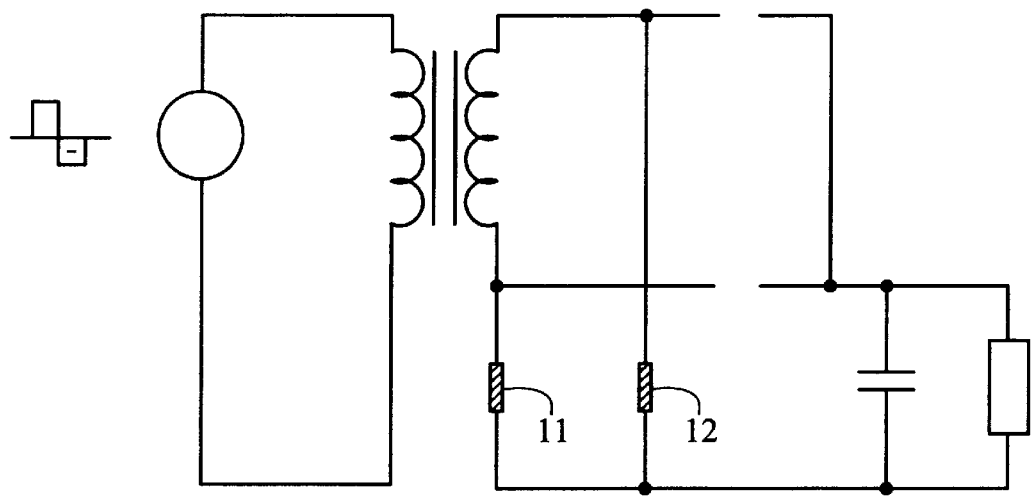
Figure 3F:
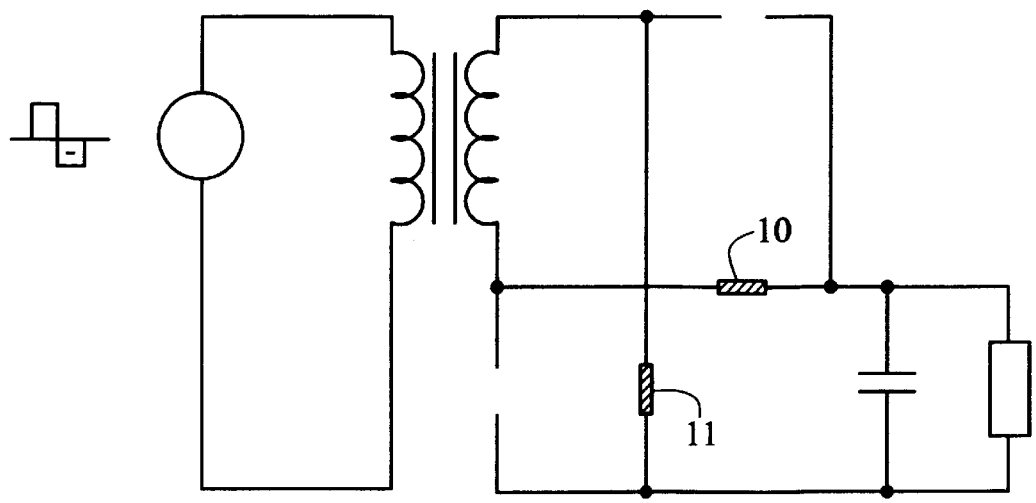

Phases 4, 5 and 6 are deduced directly from phases 3, 2 and 1 respectively. The operating diagram for these phases is represented in FIGS. 3d to 3f.

It has been found that the invention makes it possible to obtain excellent efficiencies despite difficult operating conditions. The person skilled in the art will be able, in spite of the weak coupling, to adjust the necessary parameters accordingly, such as the number of turns of the transformer or the cutoff frequency.

Owing to the characteristics of the coupler, the supply 3 of FIG. 1 is naturally protected in the event of the absence of the secondary circuit 6 or of a short-circuit.

This supply principle operates also in the case of a traditional transformer, and not only in a coupler with separate primary and secondary circuits.

What is claimed is:

1. A power transfer device including a transformer having a primary winding configured to receive energy from an alternating energy source and a secondary winding configured to transfer the energy being received by the primary winding to a rectifier bridge connected to a load, wherein the rectifier bridge comprises:

two diodes respectively connected to a first side and to a second side of the secondary winding, each diode being further connected to a first common point connected to a first side of the load;

two MOS transistors respectively connected to the first side and to the second side of the secondary winding, each MOS transistor being further connected to a second common point connected to a second side of the load; and a controller circuit configured to switch each said MOS transistor to be simultaneously in an ON state during a determined time period while the two diodes are off.

2. Device according to claim 1, wherein said time period is determined as a function of a desired output current.

3. Device according to claim 1, wherein the controller circuit is further configured to receive information regarding voltage between a respective drain and a respective source of the two MOS transistors and to turn ON the MOS transistor connected the diode in which there is an inverse voltage applied following the changing of polarity of an output from the alternating energy source received at the primary winding and no current flow there through when the drain/source voltage is zero.

4. Device according to claim 1, wherein the controller circuit is further configured to receive error information indicating a difference in voltage between a voltage across the load and a reference voltage.

* * * * *